United States Patent
Jung et al.

(10) Patent No.: US 10,019,485 B2
(45) Date of Patent: Jul. 10, 2018

(54) SEARCH QUERY BASED FORM POPULATOR

(71) Applicant: Google LLC, Mountain View, CA (US)

(72) Inventors: Young Hoon Jung, New York, NY (US); Dong Hyun Kim, Foster City, CA (US)

(73) Assignee: Google LLC, Mountain View, CA (US)

( * ) Notice: Subject to any disclaimer, the term of this patent is extended or adjusted under 35 U.S.C. 154(b) by 168 days.

(21) Appl. No.: 14/826,358

(22) Filed: Aug. 14, 2015

(65) Prior Publication Data

US 2016/0246847 A1 Aug. 25, 2016

Related U.S. Application Data

(60) Provisional application No. 62/119,496, filed on Feb. 23, 2015.

(51) Int. Cl.
| | | |
|---|---|---|
| *G06F 7/00* | (2006.01) | |
| *G06F 17/30* | (2006.01) | |
| *G06F 17/24* | (2006.01) | |
| *G06Q 10/00* | (2012.01) | |

(52) U.S. Cl.
CPC ...... *G06F 17/30528* (2013.01); *G06F 17/243* (2013.01); *G06F 17/30342* (2013.01); *G06F 17/30401* (2013.01); *G06F 17/30867* (2013.01); *G06Q 10/00* (2013.01)

(58) Field of Classification Search
CPC .......................... G06F 17/243; G06F 17/30867
See application file for complete search history.

(56) References Cited

U.S. PATENT DOCUMENTS

| | | | |
|---|---|---|---|
| 5,231,670 A | * | 7/1993 | Goldhor .................... G06F 3/16 704/275 |
| 6,910,179 B1 | * | 6/2005 | Pennell ................. G06F 17/243 705/26.8 |
| 7,185,271 B2 | | 2/2007 | Lee et al. |
| 8,713,042 B1 | | 4/2014 | Zinenko et al. |
| 2002/0032591 A1 | | 3/2002 | Mahaffy et al. |
| 2004/0073565 A1 | * | 4/2004 | Kaufman .......... G06F 17/30572 |
| 2004/0176954 A1 | * | 9/2004 | Wang ........................ G06F 3/16 704/254 |
| 2005/0257148 A1 | | 11/2005 | Goodman et al. |

(Continued)

OTHER PUBLICATIONS

Araujo et al., "Carbon: Domain-Independent Automatic Web Form Filling," Web Engineering, Springer Berlin Heidelberg, Berlin, Heidelberg, pp. 292-306, Jul. 5, 2010.

(Continued)

*Primary Examiner* — Charles Lu
(74) *Attorney, Agent, or Firm* — Fish & Richardson P.C.

(57) ABSTRACT

Methods, systems, and apparatus, including computer programs encoded on a computer storage medium, for populating a form using a search query. In one aspect, a method include actions of providing a form for display on a user device. Additional actions include, while a particular field of the form is selected, receiving a request to perform a search query, in response to receiving the request, receiving one or more query terms, obtaining a result of performing a search query that includes the one or more query terms, and automatically populating the particular field of the form with the result of the search query.

20 Claims, 4 Drawing Sheets

(56) References Cited

U.S. PATENT DOCUMENTS

| | | | |
|---|---|---|---|
| 2006/0074652 A1* | 4/2006 | Ativanichayaphong | G06F 17/243 |
| | | | 704/235 |
| 2007/0130134 A1* | 6/2007 | Ramsey ................ | G06F 17/243 |
| 2013/0282438 A1* | 10/2013 | Hunter ...................... | G01S 1/02 |
| | | | 705/7.32 |
| 2013/0290410 A1 | 10/2013 | Zhang | |
| 2013/0339030 A1* | 12/2013 | Ehsani ................. | G10L 17/005 |
| | | | 704/275 |
| 2014/0304097 A1 | 10/2014 | Milian et al. | |

OTHER PUBLICATIONS

International Search Report and Written Opinion in International Application No. PCT/US2015/062354, dated Feb. 5, 2016, 13 pages.

International Preliminary Report on Patentability, issued in International Application No. PCT/US2015/062354, dated Aug. 29, 2017, 8 pages.

\* cited by examiner

SEARCH QUERY BASED FORM POPULATOR

CROSS REFERENCE TO RELATED APPLICATION

This application claims the benefit of U.S. Provisional Application Ser. No. 62/119,496, filed on Feb. 23, 2015, which is incorporated by reference.

TECHNICAL FIELD

This disclosure generally relates to search engines, and one particular implementation relates to automatically populating fields of a form.

BACKGROUND

A computing device may receive user input through fields of forms. For example, websites may provide forms for users to fill in fields, and the websites may then perform actions based on the input from the users. In some cases, the forms can ask for information that the user may not have on hand.

SUMMARY

In general, an aspect of the subject matter described in this specification may involve a process for using a search query to aid in automatic population of fields on a form. The process may allow a user that does not remember information that is needed for a field of the form to select a field, to activate a service for automatically populating fields of a form, and then to speak one or more search query terms. For example, if the form includes a field in which a user would enter their account number for Company X and the user does not remember their account number for Company X, the user may select the field and say, "FORM POPULATOR, WHAT IS MY ACCOUNT NUMBER FOR COMPANY X?" The system may then generate a search query based at least on the transcription of the user's utterance and use a result of the search query to automatically populate the field. For example, in response to the user's question, the system may, without any further user input, generate a search query including the query terms "USER A," "ACCOUNT NUMBER," "COMPANY X," may determine a search query result of "987654," and may set the value of the field to "987654."

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of a user cannot be determined. Thus, the user may have control over how information is collected about him or her and used by a content server.

In some aspects, the subject matter described in this specification may be embodied in methods that may include the actions of providing a form for display on a user device and while a particular field of the form is selected, receiving a request to perform a search query, in response to receiving the request, receiving one or more query terms, obtaining a result of performing a search query that includes the one or more query terms, and automatically populating the particular field of the form with the result of the search query.

Other versions include corresponding systems, apparatus, and computer programs, configured to perform the actions of the methods, encoded on computer storage devices.

These and other versions may each optionally include one or more of the following features. For instance, in some implementations the result includes text, and automatically populating the particular field of the form with the result of the search query includes setting a value of the particular field to be the text without receiving additional user input after receiving the one or more query terms.

In some implementations, obtaining a result of performing a search query that includes the one or more query terms includes obtaining multiples results including the result, and automatically populating the particular field of the form with the result of the search query includes setting a value of the particular field to be text of the result without receiving additional user input after receiving a user selection of the result from the multiple results.

In some aspects, obtaining a result of performing a search query that includes the one or more query terms includes providing the one or more query terms to a search engine and receiving the result from the search engine.

In certain aspects, the result includes personal information regarding a user that has not previously been provided by the user for populating a form.

In some implementations, receiving one or more query terms includes receiving a natural language query including the one or more query terms.

In some aspects, receiving one or more query terms includes receiving acoustic features representing the one or more query terms and transcribing the acoustic features.

In certain aspects, receiving a request to perform a search query includes obtaining acoustic features representing one or more terms that indicate following acoustic features to be received represent one or more terms for a search query to populate a particular field of the form with a result of the search query.

In some implementations, receiving a request to perform a search query includes receiving user input interacting with a control for which interaction indicates following acoustic features to be received represent one or more terms for a search query to populate a particular field of the form with a result of the search query.

In some aspects, the particular field of the form is selected when focus is set on the particular field of the form.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
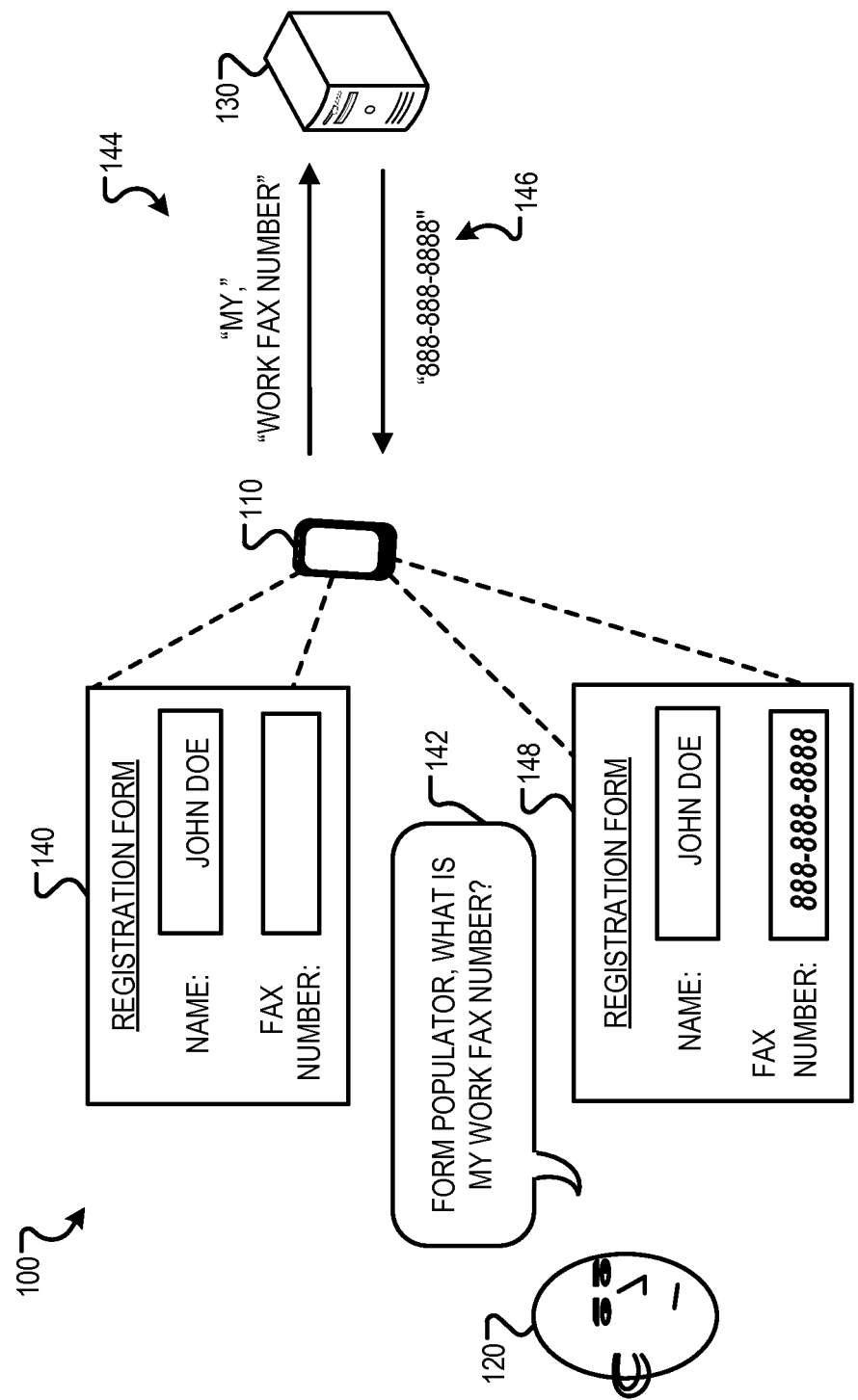
FIG. 1 is a block diagram of an example system for populating a form using a search query.

FIG. 1 is block diagram of an example system 100 for populating a form using a search query. Briefly, and as described in further detail below, the system 100 may include a user device 110, that displays a form that the user 120 may interact with to generate a search query, and a personalized search server 130 that provides a search query result for automatically populating the form.

The user device 110 may be mobile computing device, personal digital assistants, cellular telephones, smartphones, laptop, desktop, workstation, and other computing devices. The user device 110 may display a form to the user 120. For example, the user device 110 may display a graphical user interface that includes registration form 140. A form may be a document that includes one or more labelled fields for the user to enter user input. For example, the registration form 140 includes a field labeled "NAME" for a user to enter the user's name and a field labeled "FAX NUMBER" for the user to provide the user's fax number. The fields may be text entry fields in which the user may enter text. Alternatively or additionally, the fields may be non-text entry fields. For example, the fields may be a checkbox, a dropdown, a combo box, or another non-text entry field.

The user device 110 may receive a selection of a field of the form and one or more query terms for performing a search request, and in response, generate a search query 144 that includes the one or more query terms. For example, the user device 110 may receive a selection of the field labeled "FAX NUMBER" and detect the spoken phrase "FORM POPULATOR, WHAT IS MY WORK FAX NUMBER." In response, the user device 110 may generate a search query 144 that includes query terms "MY," "WORK FAX NUMBER."

A field of a form may be considered to be selected when a focus of a user interface is set on the field. For example, focus may be considered to be set on a text entry field when the field is active so a cursor is blinking in the field and the field is ready to accept text input. In another example, focus may be considered to be set on a check box field when the field is highlighted so that pressing a "SPACE" button toggles the field between "CHECKED" and "UNCHECKED." In yet another example, focus may be considered not to be set on a text entry field when the field is not active so a cursor is not blinking in the field and the field is not ready to accept text input.

In some implementations, the user device 110 may automatically set the focus on a particular field based on an utterance of user. For example, the user device 110 may receive an utterance of "FORM POPULATOR, WHAT IS MY WORK FAX NUMBER" when focus is not set on a field labeled "FAX NUMBER," and based on the utterance, set the focus on the field labeled "FAX NUMBER." In automatically setting the focus, the user device 110 may generate a transcription of the utterance, determine if the transcription matches any of the fields of the form, and if so, set the focus to the field that matches the transcription. For example, the user device 110 may determine that "FAX NUMBER" in the transcription matches the label of "FAX NUMBER" for the field labeled "FAX NUMBER," and in response, automatically set focus on the field labeled "FAX NUMBER."

The user device 110 may provide the generated search query 144 to the personalized search server 130. For example, the user device 110 may transmit the search query 144 that includes the query terms "MY," "WORK FAX NUMBER" across a network to the server 130. In response to providing the search query 144 to the server 130, the user device 110 may obtain a result 146 of the server 130 performing the search query 144. For example, the user device 110 may obtain the result 146 of "888-888-8888" from the server 130 performing the search query 144.

In response to obtaining the result 146, the user device 110 may automatically populate the selected field of the form with the result 146 of the search query 144. Automatically populating the selected field of the form with the result 146 of the search query 144 may include setting a value of the selected field to be text of a result without receiving additional user input after receiving one or more query terms. For example, the user device 110 may set the value of the field labeled "FAX NUMBER" with the value "888-888-8888" received in the result 146 and display the form 148 showing the value of the field labeled "FAX NUMBER" is "888-888-8888." In another example, the user device 110 may receive a selection of a checkbox, receive an utterance of "DO I HAVE A REWARD NUMBER WITH COMPANY X ALREADY," receive a result of "YES," and in response, set the checkbox to be checked. In yet another example, the user device 110 may receive a selection of a checkbox, receive an utterance of "DO I HAVE A REWARD NUMBER WITH COMPANY X ALREADY," receive a result of "NO," and in response, set the checkbox to be unchecked.

Figure 2:
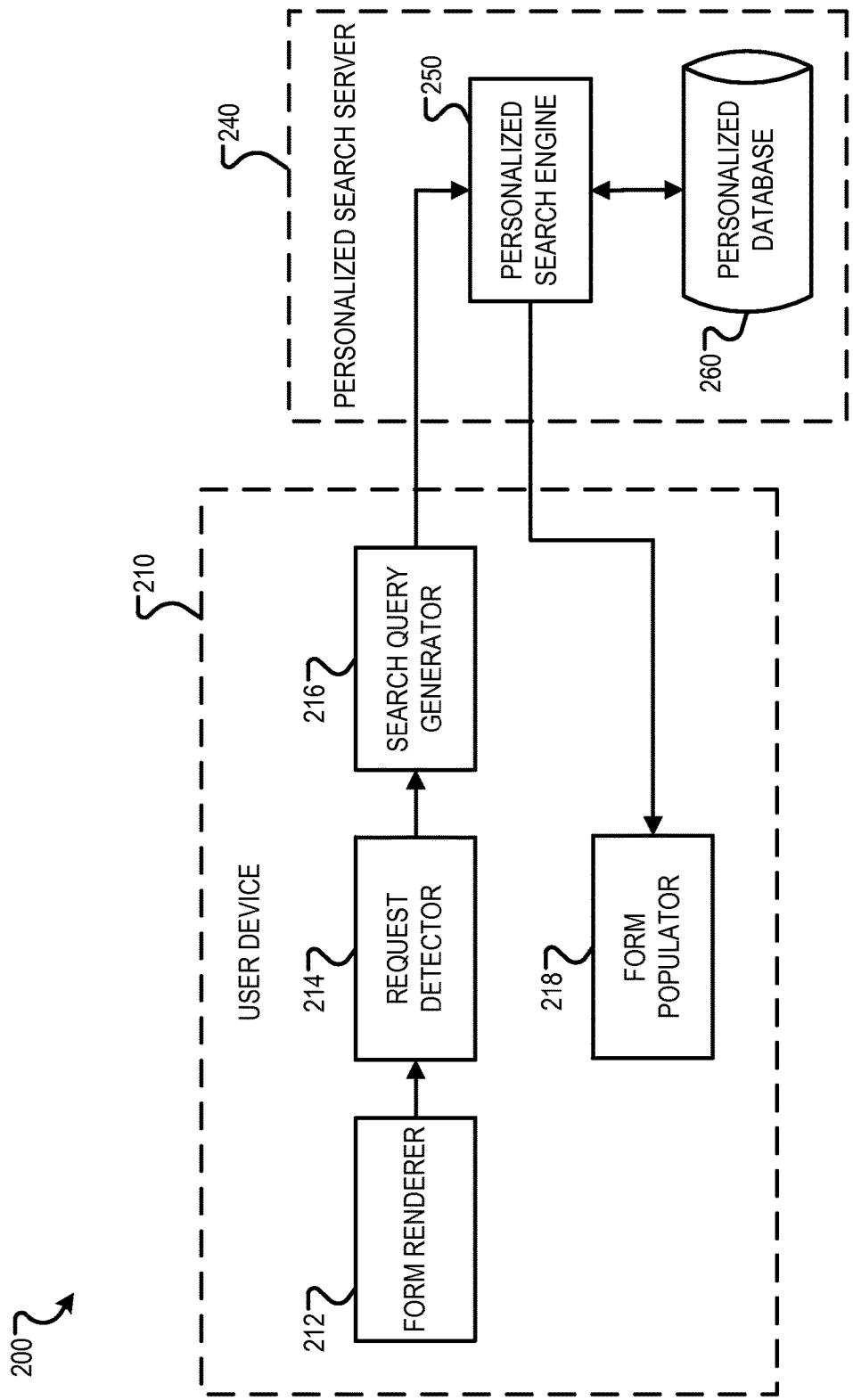
FIG. 2 is a block diagram of a user device for populating a form using a search query.

FIG. 2 is a block diagram of a user device for populating a form using a search query. Briefly, and as described in further detail below, the system 100 may include a user device 210 and a personalized search server 240. In one example, the user device 210 may be the user device 110 of FIG. 1 and the personalized search server 240 may be personalized search server 130 of FIG. 1. However, the user device 210 may be different from the user device 110 and the personalized search server 240 may be different from the personalized search server 130.

The user device 210 may include form renderer 212, request detector 214, search query generator 216, and form populator 218. The form renderer 212 may render a form including one or more fields on a display. For example, the form renderer 212 may obtain a resource, e.g., a webpage, document, or another resource, that includes form and generate a graphical user interface including the form. In some implementations, the form renderer 212 may determine that a resource includes a form, and in response, include in the graphical user interface that displays the form an element that the user may interact with to indicate that the user is providing a search query request. For example, the form may include an additional button that the user may click to indicate that the user will be providing a search request.

The request detector 214 may determine that the user is providing a search query request. The request detector 214 may determine that the user is providing a search query request based at least on user input in response to the displayed form. In one implementation, the request detector 214 may determine that the user is providing a search query request based on an utterance of the user. For example, the request detector 214 may determine that the user is providing a search query request based on obtaining acoustic features representing an utterance of "FORM POPULATOR, WHAT IS MY REWARD NUMBER FOR COMPANY X." Acoustic features may be mel-frequency cepstrum coefficients (MFCCs), linear prediction coefficients (LPGs), or some other audio representation.

In particular, the request detector 214 may determine that the user is providing a search query request based on one or more keywords that are transcribed based on acoustic features representing an utterance of a particular phrase. The particular phrase may indicate that the user will be providing a search query request, e.g., requesting a search. For example, the phrase may be "FORM POPULATOR," "POPULATE SEARCH," "OK COMPUTER," or another predetermined phrase. The request detector 214 may determine that the user is providing a search query request based on transcribing the utterance. For example, the request detector 214 may transcribe at least a portion of the acoustic features representing the phrase "FORM POPULATOR," determine that the transcription includes the particular phrase, "FORM POPULATOR," and in response, determine that the user is providing a search query request.

Additionally or alternatively, the request detector 214 may determine that the user is providing a search query request without transcribing the utterance. For example, the request detector 214 may compare the acoustic features to acoustic features for the particular phrase "FORM POPULATOR," determine that the acoustic features match, and based on the determination that the acoustic features match, determine that the user is providing a search query request.

In another implementation, the request detector 214 may detect that the user is providing a search query request based on determining that the user has interacted with an element that the user may interact with to request a search. For example, the request detector 214 may detect a selection of a button included in a graphical user interface that the user may click to indicate that the user will be providing a search request.

In some implementations, the request detector 214 may determine that the user is providing a search query request further based on determining that a field of a form is selected. For example, the request detector 214 may determine that an utterance of the user includes the phrase "FORM POPULATOR" and that focus is set on a text entry field labeled "REWARD NUMBER," and in response, determine that the user is providing a search query request. In another example, the request detector 214 may determine that an utterance of the user includes the phrase "FORM POPULATOR" and that focus is not set on a field in a displayed form, and in response, determine that the user is not providing a search query request.

The search query generator 216 may generate a search query. For example, the search query generator 216 may generate the search query including the query terms "MY," "COMPANY X," "REWARD NUMBER." The search query generator 216 may generate the search query in response to the request detector 214 determining that the user is providing a search query request.

The search query generator 216 may generate the search query based on query terms included in the utterance of the user. For example, the search query generator 216 may obtain acoustic features of the utterance of "FORM POPULATOR, WHAT IS MY REWARD NUMBER FOR COMPANY X," transcribe at least the acoustic features that correspond to the query terms "MY," "REWARD NUMBER," and "COMPANY X," and generate a search query that includes the query terms "MY," "REWARD NUMBER," and "COMPANY X."

The search query generator 216 may generate a search query that includes an identifier of the user. For example, the search query generator 216 may generate a search query that includes "MY," "REWARD NUMBER," "COMPANY X," and "USERID 564842," where "USERID 564842" is an identifier for the user. The search query generator 216 may determine to include the identifier when one or more query terms are dependent on an identity of the user. For example, the search query generator 216 may determine that the utterance includes a query term, e.g., "MY" or "I," and in response include the identifier for the user in the search query. In some implementations, the search query generator 216 may generate a search query that includes a transcription of an utterance of the user and an identifier of the user. For example, the search query generator 216 may generate a search query that includes a natural language query "WHAT IS MY REWARD NUMBER FOR COMPANY X" and a user identifier "USERID 564842."

The form populator 218 may obtain a result of performing the search query. For example, the form populator 218 may receive a result of "987654" in response to the search query including the query terms "MY," "REWARD NUMBER," and "COMPANY X." In response to receiving the result, the form populator 218 may populate the form rendered by the form renderer 212. For example, the form populator 218 may set the value of a text entry field labeled "REWARD NUMBER" with the received result of "98654" and the updated value may be displayed to a user. The form populator 218 may determine a field to populate with the received result based on determining the field that is currently selected. For example, the form populator 218 may receive "98654" as the result of a search query, determine that focus is set on the text entry field labeled "REWARD NUMBER," and populate the text entry field with the value "98654."

In some implementations, the form populator 218 may receive multiple results of performing the search query. For example, the form populator 218 may receive three results with corresponding confidence scores that indicate a confidence that the corresponding result is a correct answer to the search query. The form populator 218 may then select the result with the confidence score that indicates the highest degree of confidence. For example, the form populator 218 may determine to select a result with a confidence score of 0.8 because the confidence score is above a predetermined threshold, e.g., 0.5, 0.4, 20%, 30%, or some other amount, greater than any other confidence score. In some implementations, the form populator 218 may select the result based on the content of the form. For example, the form populator 218 may receive one result that includes numbers and one result that includes letters, determine that the field being populated has a label including "NUMBER," in response determine that a result that includes numbers is most likely to be correct, and in response, select the result that includes numbers for automatically populating the field.

In some implementations, the form populator 218 may present two or more of multiple received results to the user for the user to select the result to use for populating the selected field. For example, the form populator 218 may determine the two, three, or some other predetermined number of results that the form populator 218 has determined to be most likely to be correct, present those results for the user to select one result, and then populate the selected field with the selected result. In the case of multiple received results, automatically populating a selected field may include setting a value of the selected field to be text of a selected result without receiving additional user input after receiving a user selection of the result from the multiple received results.

In some implementations, the form populator 218 may populate the form based on analyzing a selected field. For example, the populator 218 may receive a result of "YES," determine that the type of a selected field is a checkbox, and in response to the determination, set the checkbox to be checked. In another example, the populator 218 may receive a result of "564213," determine that the selected field is a drop down menu, and select the option from the drop down menu with the value of "564213." The form populator 218 may determine how to populate a selected field based on a particular result by referencing a control value mapping. The control value mapping may define rules for how a field should be populated based on results. For example, the control value mapping may define a rule that a checkbox field should be checked if a result is "YES" and unchecked if a result is "NO." In another example, the control value mapping may define a rule that a drop down menu field with a particular option that matches a result should have the option that matches the result be selected.

In some implementation, if the form populator 218 obtains a result indicating that an answer to the search query was not found, the form populator 218 may provide an indication that an answer to the search query was not found. The indication may be audio, visual, or haptic. For example, the form populator 218 may provide a temporary pop-up window with the text "NO RESULT FOUND," output audio of "NO RESULT FOUND," set the value of the field to "NO RESULT FOUND," open up a search window for allowing a user to attempt a more advanced search, or open up a representation of the data that's in the personalized database 260 for the user to select the appropriate data.

The personalized search server 240 may include a personalized search engine 250 and a personalized database 260. The personalized search server 240 may receive a search query transmitted over a network, e.g., the Internet or local area network, by the user device 210. The personalized search engine 250 may obtain a search query and generate a search query result. For example, the personalized search engine 250 may obtain the search query "MY," "REWARD NUMBER," "COMPANY X," and "USERID 564842," and generate a search query result "98654." In another example, the personalized search engine 250 may obtain a search query including natural language, "WHAT IS MY REWARD NUMBER FOR COMPANY X and "USERID 564842," and generate the search query result "98654."

The personalized search engine 250 may generate the search query result based on searching for data stored in the personalized database 260 that the personalized search engine 250 determines is a most likely answer to the search query. For example, in response to obtaining the search query, "MY," "REWARD NUMBER," "COMPANY X," and "USERID 564842," the personalized search engine 250 may search the personalized database 260 for personal data associated with "USERID 564842" that is indicated as a reward number and indicated as for COMPANY X.

The personalized database 260 may store data that is personal to a user. For example, the data may be generated based on e-mails, text messages, search queries, calendar appointments, or other information of a user. For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of a user cannot be determined. Thus, the user may have control over how information is collected about him or her and used by a content server.

Different configurations of the system 200 may be used where functionality of the user device 210, form renderer 212, request detector 214, search query generator 216, form populator 218, personalized search server 240, personalized search engine 250, and personalized database 260 may be combined, further separated, distributed, or interchanged. The system 100 may be implemented in a single device or distributed across multiple devices.

Figure 3:
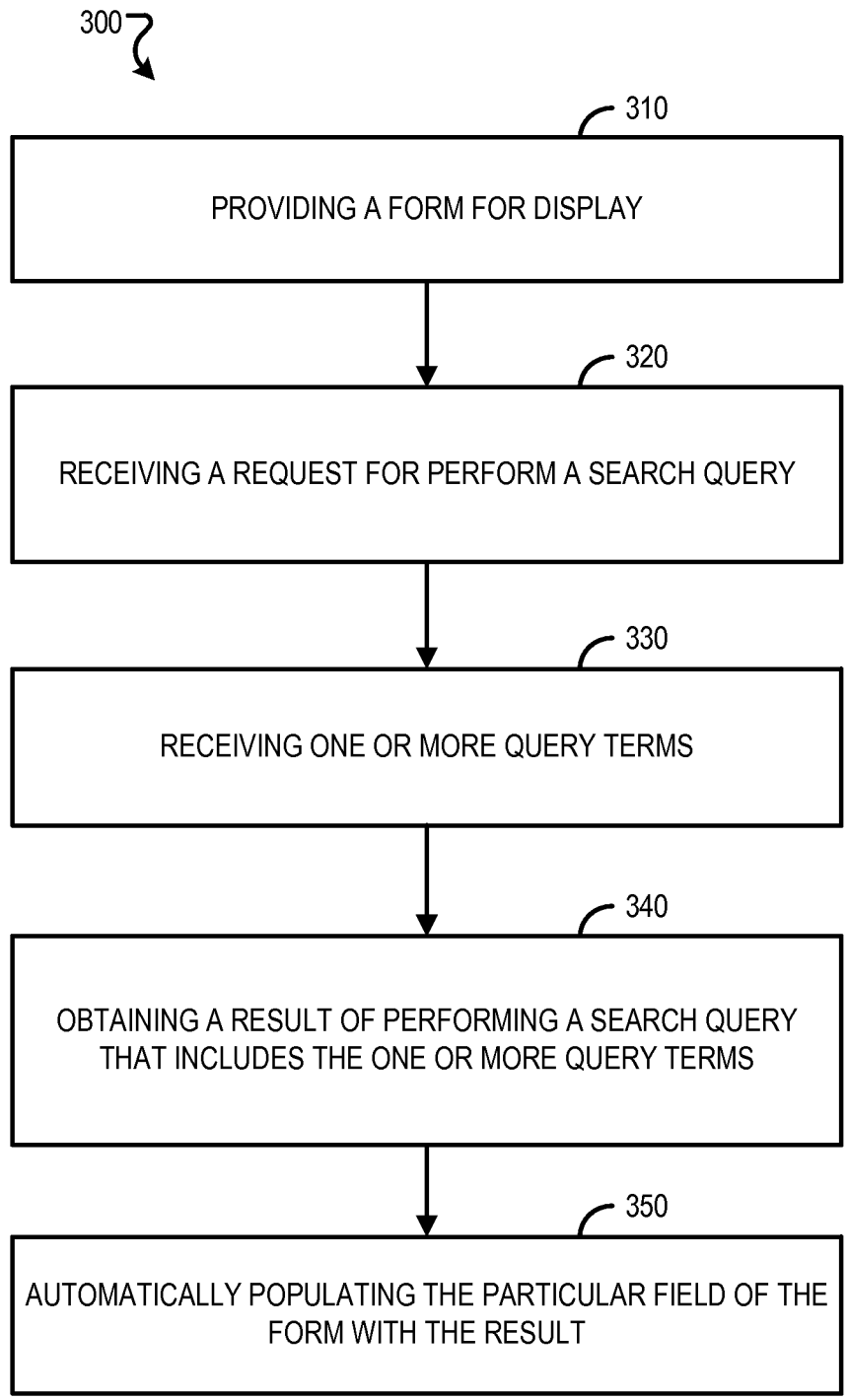
FIG. 3 is a flowchart of an example process for populating a form using a search query.

FIG. 3 is a flowchart of an example process 300 for populating a form using a search query. The following describes the process 300 as being performed by components of the systems 100 and 200 that are described with reference to FIGS. 1 and 2. However, the process 300 may be performed by other systems or system configurations.

The process 300 may include providing a form for display (310). The form renderer 212 may render a form for display on a user device 210. For example, the user device 210 may display the form 140 that includes a particular field for receiving user input. For example, the form 140 may include a text entry field labeled "FAX NUMBER."

The process may include receiving a request for performing a search query (320). The request detector 214 may detect user interaction with the form and in response determine that the user is requesting a search. For example, the request detector 214 may detect that the user has said a particular phrase, e.g., "FORM POPULATOR," for indicating that the user is requesting a search or may detect that the user has selected a button that indicates that the user is requesting a search.

The process may include receiving one or more query terms (330). The search query generator 216 may receive acoustic features representing an utterance that includes the one or more query terms. For example, the search query generator 216 may receive acoustic features representing the utterance "FORM POPULATOR, WHAT IS MY WORK FAX NUMBER" where "MY," "WORK FAX NUMBER" are query terms.

The process may include obtaining a result of performing a search query that includes the one or more query terms (340). The form populator 218 may receive a search query result from the personalized search server 240. For example, the form populator 218 may receive a search query result "888-888-8888" in response to the search query, "MY" and "WORK FAX NUMBER."

The process may include automatically populating the particular field of the form with the result (350). The form populator 218 may automatically populate the particular field. For example, the form populator 218 may populate the particular field labeled "FAX NUMBER" that is currently selected with the search query result value "888-888-8888" without any user input after the user says "FORM POPULATOR, WHAT IS MY WORK FAX NUMBER."

In some implementations, the search query generator 216 may generate a search query that includes acoustic features of an utterance. For example, the search query generator 216 may determine that acoustic features of an utterance include acoustic features matching an utterance of "FORM POPULATOR," and in response, provide all the acoustic features or only the remaining acoustic features for the utterance to the personalized search server 240 along with a user identifier. The personalized search server 240 may then perform speech to text recognition on the received acoustic features of the utterance, determine a search query based at least on the text and user identifier, determine a result of the search query, and provide the result to the form populator 218.

In some implementations, the search query generator 216 may generate a search query without receiving query terms from a user. For example, the request detector 214 may determine that the user is requesting a search query based on the user interacting with a button that the user selects to indicate that the user is requesting a search request, or based on the user saying "FORM POPULATOR." The search query generator 216 may then analyze the form to determine one or more query terms for the search query. For example, the search query generator 216 may determine that the form is titled "REGISTRATION FORM FOR COMPANY X," determine that focus in the form is currently set on a field labeled "REWARD NUMBER," determine that a user currently using the user device 210 is "JOHN DOE," and in response generate a search query, "COMPANY X," "REWARD NUMBER," "JOHN DOE." The personalized search server 240 may then determine a result of the search query and provide the result to the form populator 218. The form populator 218 may then populate the form using the result. The search query generator 216 may determine one or more query terms based on visual information in the form or metadata for the form. For example, the search query generator 216 may determine a query term based on a visual label that is associated with a field or based on metadata that defines a name of the field.

Figure 4:
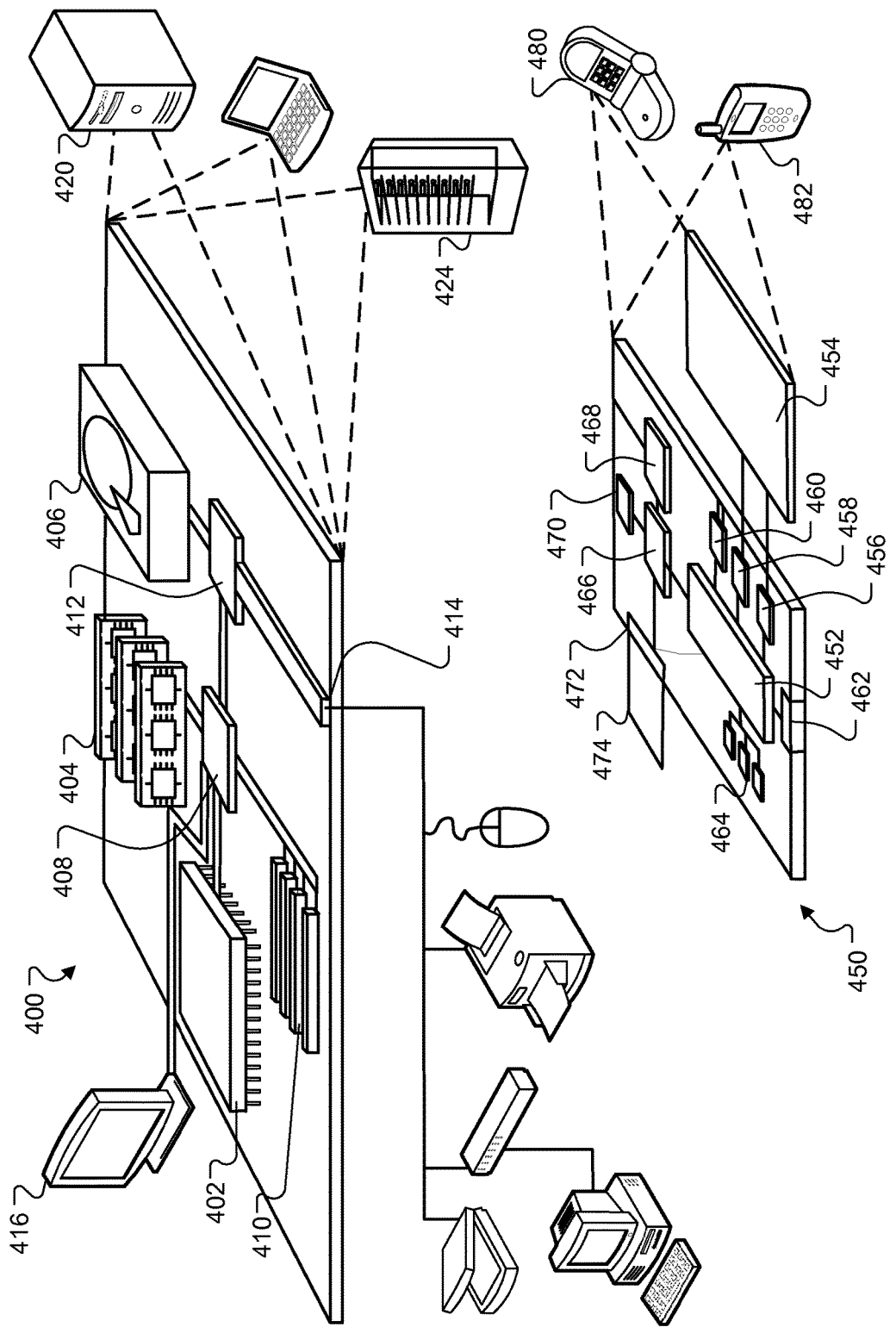
FIG. 4 is a diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method comprising:
displaying a form including a plurality of form fields on a user device, each form field having a corresponding field label;
receiving an utterance of one or more words from a user;
setting a focus on at least one form field on the form based only on the utterance by generating a transcription of the utterance, determining if one or more words of the transcription matches any of the field labels of the fields in the form, and setting the focus to the field with the field label that matches one or more words of the transcription and in response:
generating a search query that includes transforming a portion of the utterance into one or more query terms;
providing the generated search query to a personalized search server;
obtaining a result, from the personalized search server, of performing the generated search query;
determining how to populate the at least one form field on the form based on the result by referencing a control value mapping that defines rules for how the field should be populated; and
populating, without user interaction, the at least one form field with the result of the generated search query.

2. The computer-implemented method of claim 1, wherein the result comprises text, and wherein populating the particular field of the form with the result of the search query comprises setting a value of the particular field to be the text without receiving additional user input after receiving the one or more query terms.

3. The computer-implemented method of claim 1, wherein obtaining a result of performing the generated search query comprises obtaining multiple results including the result, wherein populating the particular field of the form with the result of the search query comprises setting a value of the particular field to be text of the result without user interaction with the at least one form field after receiving a user selection of the result from the multiple results.

4. The computer-implemented method of claim 1, wherein obtaining a result of performing the generated search query comprises:
providing the one or more query terms to a search engine; and
receiving the result from the search engine.

5. The computer-implemented method of claim 1, wherein the result comprises personal information regarding a user that has not previously been provided by the user for populating a form.

6. The computer-implemented method of claim 1, wherein receiving an utterance of one or more words from the user comprises receiving a natural language query including the one or more query terms.

7. The computer-implemented method of claim 1, wherein receiving an utterance of one or more words from a user comprises:
receiving acoustic features representing one or more query terms; and
transcribing the acoustic features.

8. The computer-implemented method of claim 1, wherein generating a search query that includes one or more query terms that correspond to the one or more words of the utterance comprises:
obtaining acoustic features representing one or more terms that indicate that subsequently received acoustic features represent one or more terms for a search query executed to populate a particular field of the form with a result of the search query.

9. The computer-implemented method of claim 1, wherein receiving an utterance of one or more words from the user, the utterance associated with the at least one form field included on the form comprises:
receiving user input interacting with a control for which interaction indicates that subsequently received acoustic features represent one or more terms for a search query to populate a particular field of the form with a result of the search query.

10. The computer-implemented method of claim 1, wherein the particular field of the form is selected when focus is set on the particular field of the form.

11. A system comprising:
one or more computers; and
one or more storage devices storing instructions that are operable, when executed by the one or more computers, to cause the one or more computers to perform operations comprising:
displaying a form including a plurality of form fields on a user device, each form field having a corresponding field label;
receiving an utterance of one or more words from a user;
setting a focus on the at least one form field on the form based on the utterance by generating a transcription of the utterance, determining if one or more words of the transcription match any of the fields labels of the fields in the form, and setting the focus to the field with the field label that matches one or more words of the transcription and in response:
generating a search query that includes transforming a portion of the utterance into one or more query terms;
providing the generated search query to a personalized search server;
obtaining a result, from the personalized search server, of performing the generated search query;
determining how to populate the at least one form field on the form based on the result by referencing a control value mapping that defines rules for how the field should be populated; and
populating, without user interaction, the at least one form field with the result of the generated search query.

12. The system of claim 11, wherein the result comprises text, and wherein populating the particular field of the form with the result of the search query comprises setting a value of the particular field to be the text without receiving additional user input after receiving the one or more query terms.

13. The system of claim 11, wherein obtaining a result of performing the generated search query that comprises obtaining multiple results including the result, wherein populating the particular field of the form with the result of the search query comprises setting a value of the particular field to be text of the result without user interaction with the at least one form field after receiving a user selection of the result from the multiple results.

14. The system of claim 11, wherein obtaining a result of performing the generated search query comprises:
providing the one or more query terms to a search engine; and
receiving the result from the search engine.

15. The system of claim 11, wherein the result comprises personal information regarding a user that has not previously been provided by the user for populating a form.

16. The system of claim 11, wherein receiving an utterance of one or more words from the user comprises receiving a natural language query including the one or more query terms.

17. The system of claim 11, wherein receiving an utterance of one or more words from a user comprises:
   receiving acoustic features representing the one or more query terms; and
   transcribing the acoustic features.

18. The system of claim 11, wherein generating a search query that includes one or more query terms that correspond to the one or more words of the utterance comprises:
   obtaining acoustic features representing one or more terms that indicate that subsequently received acoustic features represent one or more terms for a search query executed to populate a particular field of the form with a result of the search query.

19. The system of claim 11, wherein receiving an utterance of one or more words from the user, the utterance associated with the at least one form field included on the form comprises:
   receiving user input interacting with a control for which interaction indicates that subsequently received acoustic features represent one or more terms for a search query to populate a particular field of the form with a result of the search query.

20. A non-transitory computer-readable medium storing instructions executable by one or more computers which, upon such execution, cause the one or more computers to perform operations comprising:
   displaying a form, including a plurality of form fields, on a user device, each form field having a corresponding field label;
   receiving an utterance of one or more words from a user;
   setting a focus on at least one form field on the form based on the utterance by generating a transcription of the utterance, determining if one or more words of the transcription matches any of the field labels of the fields in the form, and setting the focus to the field with the field label that matches one or more words of the transcription and in response:
   generating a search query that includes transforming a portion of the utterance into one or more query terms;
   providing the generated search query to a personalized search server;
   obtaining a result, from the personalized search server, of performing the generated search query;
   determining how to populate the at least one form field on the form based on the result by referencing a control value mapping that defines rules for how the field should be populated; and
   populating, without user interaction, the at least one form field with the result of the generated search query.

* * * * *